United States Patent
Lewis et al.

(10) Patent No.: US 7,917,762 B2
(45) Date of Patent: Mar. 29, 2011

(54) SECURE EXECUTION ENVIRONMENT BY PREVENTING EXECUTION OF UNAUTHORIZED BOOT LOADERS

(75) Inventors: Timothy Andrew Lewis, El Dorado Hills, CA (US); Timothy Joseph Markey, San Jose, CA (US)

(73) Assignee: Phoenix Technologies Ltd., Milpitas, CA (US)

( * ) Notice: Subject to any disclaimer, the term of this patent is extended or adjusted under 35 U.S.C. 154(b) by 776 days.

(21) Appl. No.: 11/529,140

(22) Filed: Sep. 28, 2006

(65) Prior Publication Data

US 2007/0079112 A1 Apr. 5, 2007

Related U.S. Application Data

(60) Provisional application No. 60/723,164, filed on Sep. 30, 2005.

(51) Int. Cl.
*H04L 9/32* (2006.01)

(52) U.S. Cl. ............... 713/176; 726/4; 726/10; 705/54; 713/180

(58) Field of Classification Search .............. 713/2, 181, 713/176

See application file for complete search history.

(56) References Cited

U.S. PATENT DOCUMENTS

| | | | | |
|---|---|---|---|---|
| 6,263,431 | B1 * | 7/2001 | Lovelace et al. | 713/2 |
| 2003/0229777 | A1 * | 12/2003 | Morais et al. | 713/2 |
| 2005/0216760 | A1 | 9/2005 | Rabin et al. | |
| 2007/0079112 | A1 * | 4/2007 | Lewis et al. | 713/2 |

OTHER PUBLICATIONS

International Search Report and Written Opinion dated Mar. 26, 2008 in International Application No. PCT/US 06/38450 (8 pages).

* cited by examiner

*Primary Examiner* — Taghi T. Arani
*Assistant Examiner* — Mahfuzur Rahman
(74) *Attorney, Agent, or Firm* — Mahamedi Paradice Kreisman LLP; Christopher J. Brokaw

(57) ABSTRACT

A device and method for providing a secure execution environment includes retrieving a boot loader, for example, from the memory of an electronic device or from a peripheral component. Next, a determination is made as to whether the boot loader is authorized to be executed on the corresponding electronic device. If the boot loader is authorized, then the boot loader code is executed. By only allowing execution of authorized boot loaders, security related breaches are substantially reduced or eliminated; thereby, enhancing device integrity.

14 Claims, 3 Drawing Sheets

SECURE EXECUTION ENVIRONMENT BY PREVENTING EXECUTION OF UNAUTHORIZED BOOT LOADERS

This Application claims the benefit of U.S. Provisional Application Ser. No. 60/723,164, filed Sep. 30, 2005.

FIELD OF THE INVENTION

The present invention generally relates to secure device operation and, more particularly, to preventing system firmware from executing unauthorized boot loaders and any corresponding firmware or applications.

BACKGROUND OF THE INVENTION

System firmware, for example, basic input/output system (BIOS) or core system software code is typically maintained within a non-volatile memory of a corresponding electronic device, for example, a desktop computer, laptop computer, personal digital assistant (PDA), set top boxes, servers, point-of-sale (POS) devices, automated teller machines (ATMs), wireless communication devices, for example, cellular telephones and other suitable devices and combinations thereof. The system firmware is operative to recognize and initialize the hardware subsystems and components of the electronic device and transfer control of the electronic device to an applicable operating system, upon completion of the initialization process. The firmware transfers device control to the operating system by loading the operating system boot loader during the initialization process, sometimes referred to as the power on self test (POST) process. The boot loader is a small program that causes the electronic device to retrieve the operating system from a predetermined location within non-volatile memory and load the same into the device memory, for example, system memory when the electronic device is booted, and also start the operating system.

Typically, the firmware assumes that the operating system boot loader is authorized and thereby executes the boot loader without performing any authorization, validation or verification procedures on the boot loader. A drawback associated with the aforementioned assumption is that the boot loader may have malicious or otherwise unwanted code incorporated therein that may harm one or more of the subsystems of the underlying electronic device; thereby, bypassing any security procedures implemented on the electronic device. Another drawback associated with the aforementioned assumption is that it prevents the underlying electronic device from determining whether the boot loader, or the corresponding operating system, has been modified.

A conventional method used to authorize a boot loader is to rely on the operating system installer and the system firmware vendor agreeing to only provide authorized, up to date boot loaders. A drawback with relying on such a system is that it does not resolve the potential issues of a third party introducing a corrupted boot loader or operating system into the electronic device.

SUMMARY OF THE INVENTION

The present invention provides an authorization method by which a boot loader is authorized for execution before an underlying electronic device executes the boot loader code. By performing the authorization method of the present invention, modifications to the boot loader may also be detected. The authorization may be accomplished, for example, by retrieving the boot loader from memory and determining whether the boot loader is authorized to be executed. This may be accomplished, for example, by performing a hash function on at least a portion of the boot loader, and comparing the generated hash value with a list of hash values (or previously authorized images) maintained within the non-volatile memory of the electronic device. Alternatively, a public/private key exchange methodology may be used to determine whether the boot loader image is, or has been, cryptographically signed by an authorized authority. Then, execute the boot loader code if the code is authorized.

If it is determined that the boot loader code is not initially authorized to be executed, the method then attempts to authorize the boot loader. This may be accomplished, for example, by adding a hashed image of the boot loader code to the list of authorized boot loaders. Such an addition may be the result, for example, of the user approving the addition of the boot loader to the approved list; or adding the boot loader to the approved list based on the boot loader originating from a database maintained on a trusted server or other suitable source. If the boot loader is not authorized to be executed, the process stops and an error message advising of the unauthorized status is sent to the user.

An advantage provided by the present invention is that it prevents system firmware from executing unauthorized boot loaders or corresponding operating system code without affecting system or device performance.

Another advantage provided by the present invention is that it provides for the detection of changes made to operating system boot loaders.

BRIEF DESCRIPTION OF THE DRAWINGS

The present invention and the advantages and features provided thereby will be better appreciated and understood upon review of the following detailed description of the invention, taken in conjunction with the following drawings, where like numerals represent like elements, in which.

DETAILED DESCRIPTION OF THE INVENTION

Figure 1:
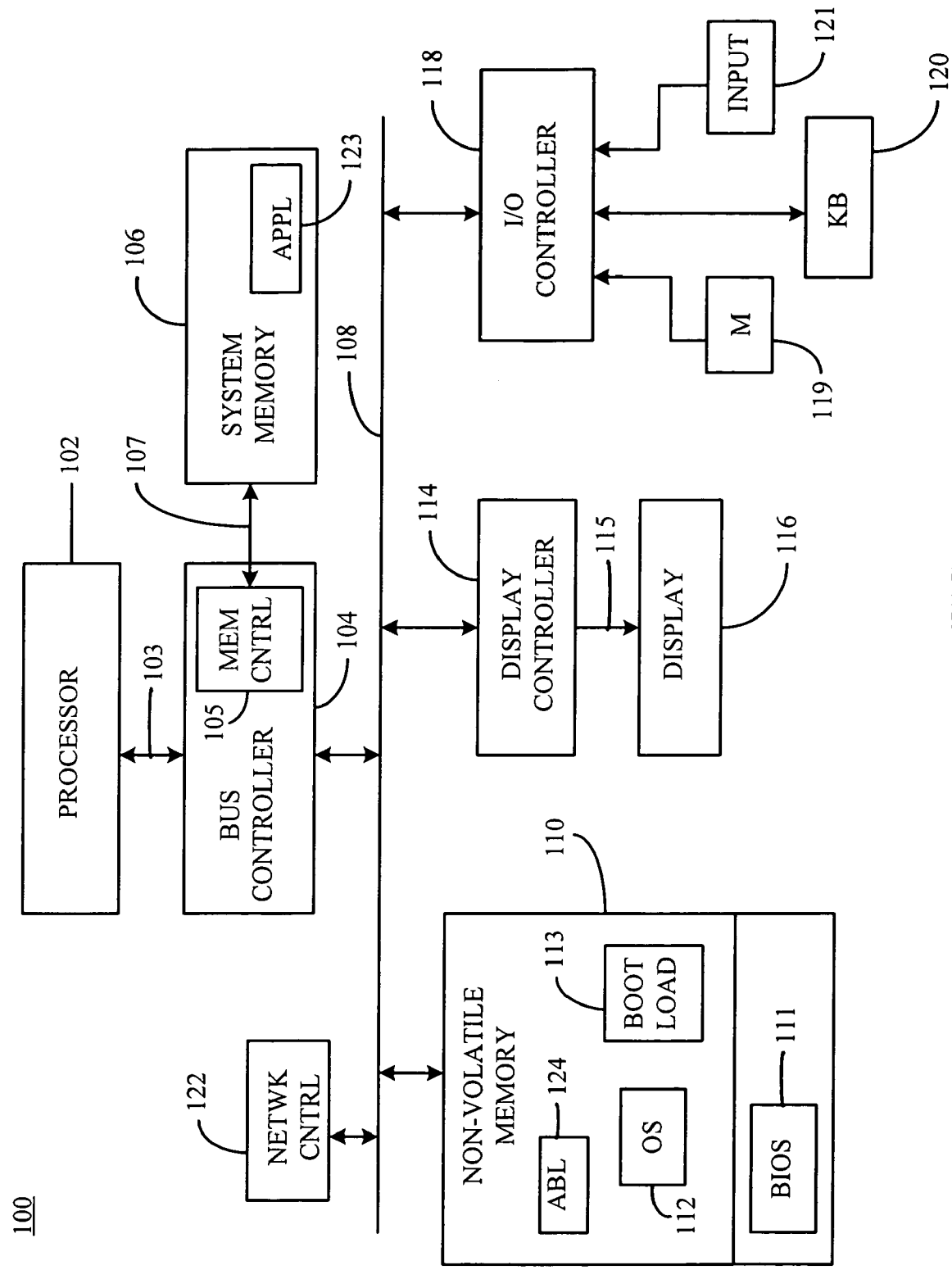
FIG. 1 is a schematic block diagram of an exemplary electronic device configured to provide the secure execution environment according to the present invention.

An exemplary embodiment of the present invention will now be described with reference to FIGS. 1-3. FIG. 1 is a schematic block diagram of an exemplary electronic device 100, for example, a desktop computer, a laptop computer, a palm top computer, a router or set-top box, a server, a personal digital assistant (PDA), a communications device, for example, a cellular telephone or other suitable device and combinations thereof, configured to implement the secure execution environment of the present invention. For purposes of illustration, and not limitation, the electronic device 100 is implemented as a laptop computer.

The laptop computer 100 includes a processor 102 configured to control the overall operation of the device. The processor 102 may include an arithmetic logic unit (ALU) for performing computations, one or more registers for temporary storage of data and instructions, and a controller for controlling the operation of the laptop computer 100. In one embodiment, the processor 102 includes any one of the x86, Pentium™ and Pentium Pro™ and other suitable microprocessors manufactured by Intel corporation, or the 680X0 processor marketed by Motorola or the Power PC™ or other suitable processor marketed by International Business Machines. In addition, any of a variety of other processors, including those from Sun Microsystems, NEC, Cyrix and others may be used for implementing the processor 102. The processor 102 is not limited to microprocessors, but may take on other forms such as microcontrollers, digital signal processors (DSP), dedicated hardware (e.g. ASIC), state machines or software executing on one or more processors distributed across a network.

The processor 102 is coupled to a bus controller 104 by way of a central processing unit (CPU) bus 103. The bus controller 104 includes a memory controller 105 integrated therein. The memory controller 105 provides for access by the processor 102 or other devices to system memory 106, for example, random access memory (RAM) or other fast access memory device. The system memory 106 may include one or more application programs (APPL) 123 maintained therein, for example, word processing applications, Audio/Video/MP3 applications, virus protection applications or other suitable application programs and combinations thereof.

The bus controller 104 is coupled to a system bus 108, for example, a peripheral component interconnect (PCI) bus, industry standard architecture (ISA) bus, universal serial bus (USB), a wireless connection or other suitable communication medium. Coupled to the system bus 108 is a non-volatile memory 110, for example, a read only memory (ROM), a non-volatile random access memory (NVRAM), a hard disk, a ROM BIOS for maintaining the code segments and corresponding data segments that, when executed by the processor 102, implement and provide the secure execution environment methodology according to the present invention. Also maintained within the non-volatile memory 110 is the basic input/output system (BIOS) code 111 of the laptop computer 100, the operating system 112 that executes on the laptop computer 100 and a corresponding boot loader 113. The boot loader 113 is a small program or piece of code that causes the processor 102 to retrieve the operating system 112 from a predetermined location within the non-volatile memory 110 and load the operating system 112 into the device memory, for example, system memory 106 when the laptop computer 100 is booted, and also start the operating system 112. Also maintained in the non-volatile memory 110 is a list of authorized boot loaders (ABL) 124, which have been pre-authorized to execute on the laptop computer 100. The list of authorized boot loaders 124 may have been initially installed by the manufacturer of the laptop computer 100, installed by the user or updated or otherwise revised, for example, by the secure execution environment method of the present invention.

Also coupled to the system bus 108 is a display controller 114, operative to transfer data 115 for display on a corresponding display device 116, an input/output (I/O) controller 118 and a network controller 122, for example, a wireless network controller. The display controller 114 may be implemented by any suitable device, for example, a graphics processor, capable of formatting digital data 115 for proper display and viewing on a corresponding display device 116, for example, a flat panel display, CRT display, printer, plotter or other suitable presentation device and combinations thereof.

The I/O controller 118 may be implemented by any suitable device capable of transferring information, for example, signals containing data and/or instructions between the processor 102 and a variety of input and/or output devices including, but not limited to, a mouse 119, keyboard 120, and pen input device 121. The pen input device 121 may be implemented as a touch screen, soft keys, optical input device or other suitable input devices or combinations thereof.

The network controller 122 may be implemented, for example, by a wireless network access controller or other suitable device or applicable software capable of connecting the underlying laptop computer 100 to a larger network, for example, the Internet.

When implemented in software, the elements of the present invention are essentially the code segments to perform the necessary tasks. The program or code segments can be stored, for example, in a processor readable medium or transmitted by a computer data signal embodied in a carrier wave over a transmission medium or communication link that can be accessed, for example, by the network controller 122. The processor readable medium may include, for example, an electronic circuit, a semiconductor memory device, a ROM, RAM, a flash memory, an erasable ROM (EROM), a floppy diskette, a CD-ROM, an optical disk, a hard disk, a fiber optic medium, a radio frequency (RF) link or any suitable medium or combination thereof. The computer data signal may include any signal that can propagate over a transmission medium, for example, electronic network channels, optical fibers, air, electromagnetic, RF links or any other suitable medium or combination thereof. The code segments may be downloaded via computer networks, for example, the Internet, LAN, WAN or any suitable network or combination thereof.

In application, the boot loader code 113 is transmitted to the system memory 106 for execution by the processor 102. By being maintained in non-volatile memory 110, the boot loader code 113 and list of authorized boot loaders 124 will not be lost or overwritten as a result of power being removed from the laptop computer 100. The method of authorizing boot loaders and allowing the secure execution of the boot loader, and corresponding operating system, will now be discussed with reference to FIGS. 2-3.

Figure 2:
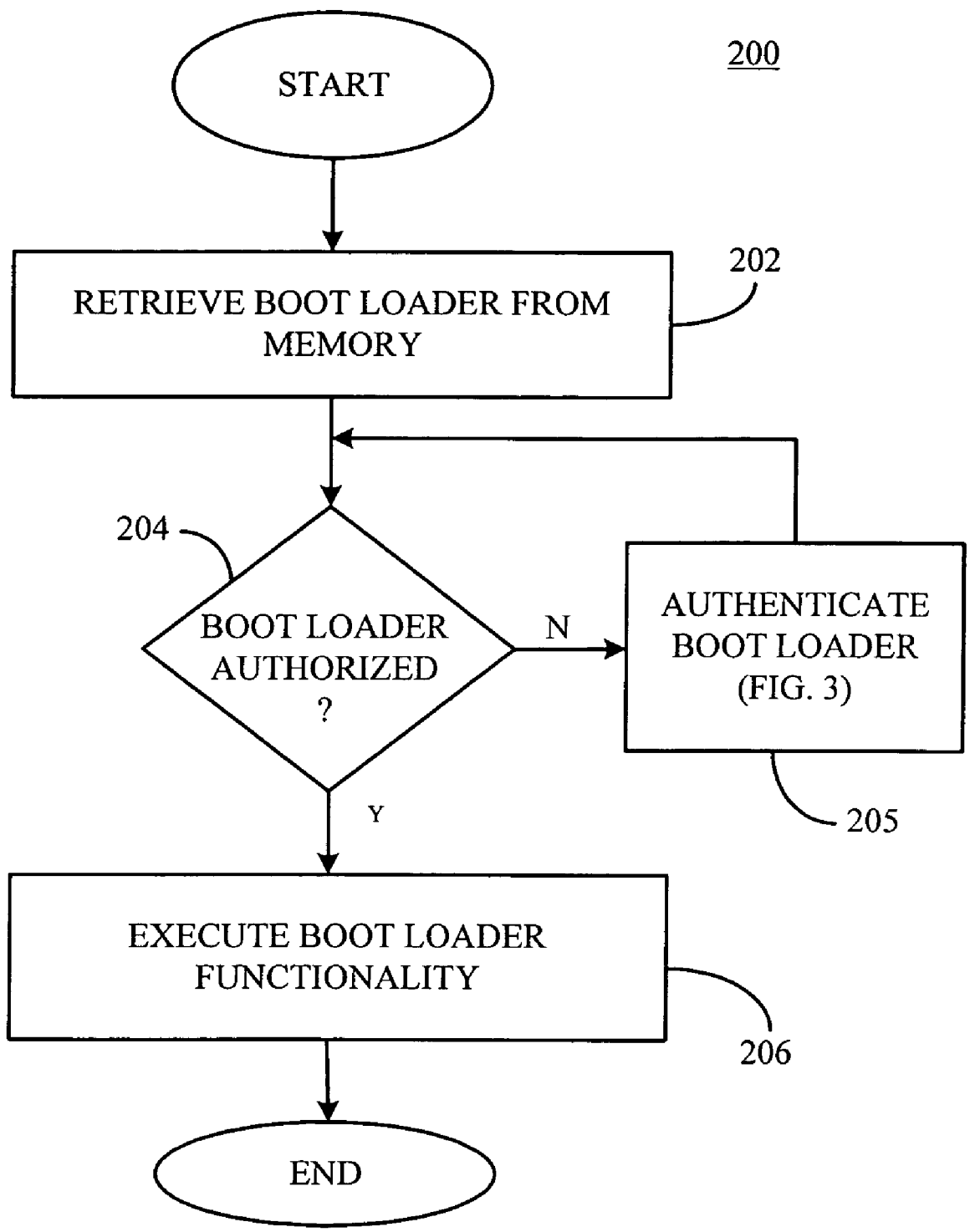
FIG. 2 is a flow chart illustrating the operations performed by the exemplary electronic device to provide the secure execution environment according to the present invention.
Figure 3:
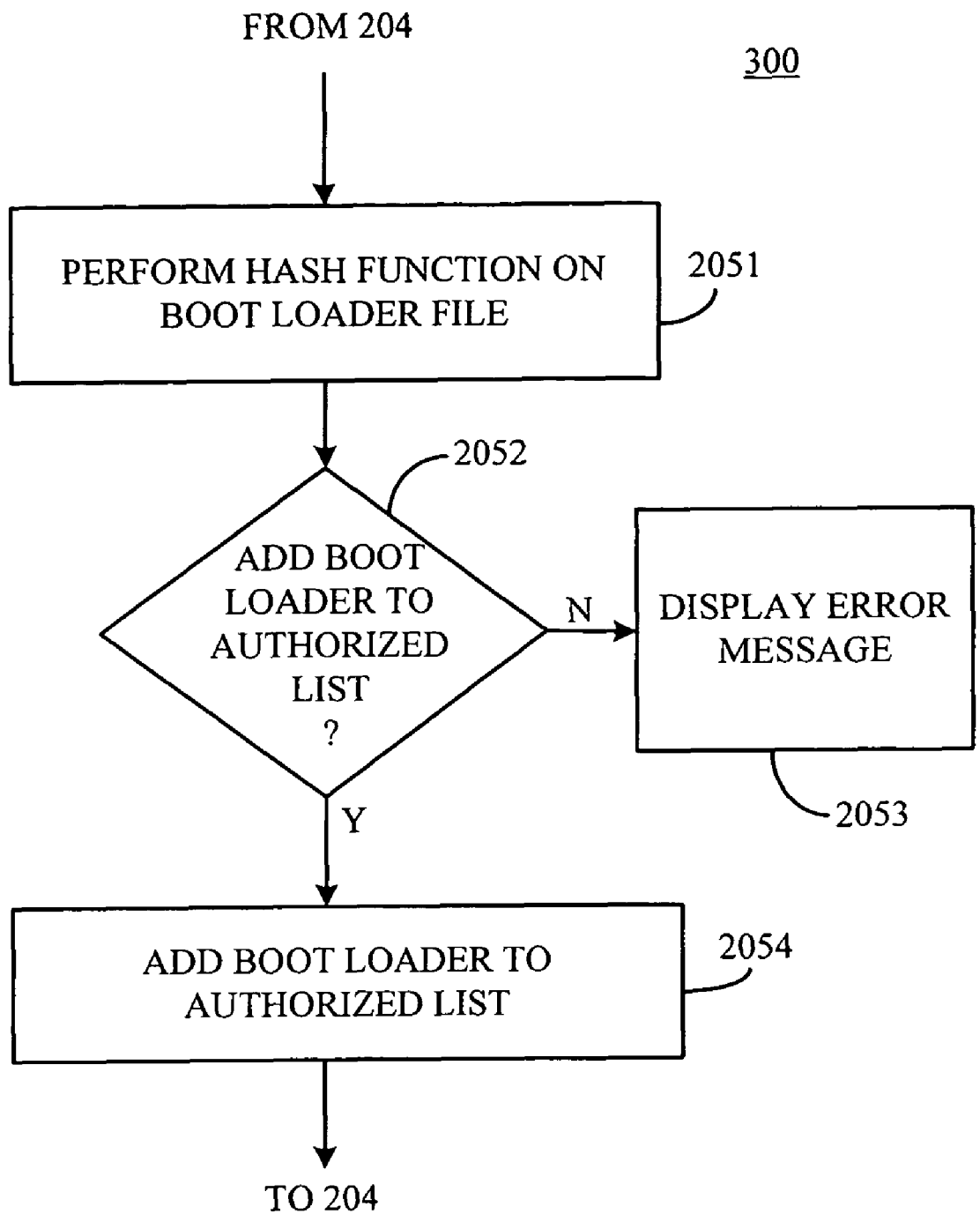
FIG. 3 is a flow chart illustrating the boot loader authentication operations performed by the exemplary electronic device according to the present invention.

FIG. 2 is a flow chart illustrating the method 200 performed by the laptop computer 100 to provide the secure execution environment according to the present invention. Stated another way, the method 200 illustrated in FIG. 2, when executed by the laptop computer, prevents system firmware (e.g. BIOS or other core system software) from executing an unauthorized boot loader, and therefore, a corresponding unauthorized operating system. Such unauthorized code may be contained, for example, within option read-only memories or other internal or external devices that are coupled to the laptop computer. The following steps are performed during the start up or initialization period (e.g. POST) of the laptop computer 100 or otherwise outside of the period that the applicable operation system is executing. Thus, the present invention executes in what is referred to as the pre-operating system environment. The method begins at step 202 and continues through step 206, where normal operation of the laptop computer 100 commences or resumes.

In step 202, the laptop computer 100 retrieves the boot loader from memory. This may be accomplished, for example, by the processor retrieving the boot loader code from a predetermined portion or section of the non-volatile memory during POST, or monitoring the system bus in order to detect any devices coupled to a corresponding internal expansion slot or external connection port or other connection point to the system bus for components that may include boot loaders.

In step 204, a determination is made as to whether the retrieved boot loader is authorized to be executed by the processor of the laptop computer. This may be accomplished, for example, by the processor or other suitable controller performing a hash function, for example, a SHA-1 function, on the visible portion of the boot loader code, and comparing the generated hash value with a list of hash values (or previously authorized boot loader images) maintained within the authorized boot loader list of the non-volatile memory. The list of authorized boot loaders includes a list of hash values representing the image of authorized boot loaders. The list may be initially populated by the manufacturer of the laptop computer; by the user by adding known boot loaders to the list; by information and data contained within a smart token; and/or by a central database contained within a trusted server. If the boot loader is authorized, in other words, the image (e.g. hash) of the boot loader is one of the authorized images contained within the authorized list, the process proceeds to step 206; otherwise, the process moves to step 205.

In step 205, the boot loader is authenticated by proceeding through an authorization process. Referring briefly to FIG. 3, the authorization process 300 will be discussed. In step 2051, the processor performs a hash function, for example, an SHA-1 hash, on the retrieved boot loader. In step 2052, a determination is made as to whether to add the boot loader image to the authorized list. This may be accomplished, for example, by the user approving the addition of the boot loader image to the authorized list through the entry of a password or other indication of authority into the laptop computer; by the image being provided by a central database connected to a trusted server; or by the boot loader code being provided by an authorized option read-only memory being provided from an authorized smart token. Alternatively, a public/private key exchange methodology may be used to determine whether the boot loader image is, or has been, cryptographically signed by an authorized authority.

If the boot loader is to be added to the authorized boot loader list, the process proceeds to step 2054 where the hashed image of the boot loader code is written to that portion of the non-volatile memory maintaining the authorized boot loader list. The process then returns to step 204. If the boot loader code image is not be added to the approved or authorized list, the process moves to step 2053.

In step 2053, an error message is displayed to the user indicating that the detected boot loader code is not authorized and will not be added to the authorized boot loader list or executed. As a result, the boot loader code will not be recognized or allowed to run on or in conjunction with the laptop computer. Although described as being a visual warning, the error message provided to the user may be an audible warning, for example, the sounding of an alarm or other audible signal, or a combination of visual and audible warnings. After the error message is displayed or otherwise provided to the user, the authorization process ends and the laptop computer resumes pre-authorization execution, enters an intermediary operating state or shuts down. Returning to FIG. 2, if the boot loader code is either present in the initial authorized list or added to the authorized boot loader list by the authorization process in step 205, the process proceeds to step 206 where the boot loader code is executed.

By implementing the method of the present invention, a secure operating system execution environment is established and maintained within an electronic device by preventing the system firmware (e.g. BIOS or core system software) from executing unauthorized boot loaders and corresponding operating system code. In this manner, security breaches related to the application or insertion of unauthorized boot loaders or operating systems code within an electronic device are substantially reduced or eliminated.

The foregoing detailed description of the invention has been provided for the purposes of illustration and description. Although an exemplary embodiment of the present invention has been described in detail herein with reference to the accompanying drawings, it is to be understood that the invention is not limited to the precise embodiment(s) disclosed, and that various changes and modifications to the invention are possible in light of the above teachings. Accordingly, the scope of the present invention is to be defined by the claims appended hereto.

What is claimed is:

1. A method for providing a secure execution environment, comprising:

retrieving a boot loader from a memory, wherein the boot loader loads a sequence of instructions that are stored in a different physical component than the memory;

determining whether the boot loader is authorized to be executed by consulting a list of approved boot loaders, wherein determining whether the boot loader is authorized to be executed includes performing a hash function on visible components of the boot loader to generate a hash value, and comparing the generated hash value with a list of approved hash values, where each approved hash value corresponds to an authorized boot loader;

preventing boot loader code from executing if the boot loader is not authorized; and receiving data indicating that the generated hash value should be added to the list of approved boot loaders by execution of a private key/public key exchange methodology.

2. The method of claim 1, further including receiving data indicating that the generated has value should be added to the approved list is received from an end user.

3. The method of claim 1, wherein the data indicating that the generated hash value should be added to the approved boot loader list from an external entity.

4. The method of claim 3, wherein the external entity may be one of the following: a database connected to a trusted server, and an option read only memory image provided by a smart token.

5. The method of claim 1, further including the step of providing an indication that the boot loader cannot be executed when it is not authorized.

6. The method of claim 1, wherein the sequence of instructions is either an operating system or a software application.

7. An electronic device, comprising:

a processor; and a memory, coupled to the processor, the memory maintaining instructions that when executed by the processor, cause the processor to:

retrieve a boot loader from the memory, wherein the boot loader loads a sequence of instructions that are stored in a different physical component than the memory, determine whether the boot loader is authorized to be executed by consulting a list of approved boot loaders by:

perform a hash function on visible components of the boot loader to generate a hash value, and compare the generated hash value with a list of approved hash values, where each approved hash value corresponds to an authorized boot loader, prevent boot loader code from executing if the boot loader is not authorized; and receive data indicating that the generated hash value should be added to the list of approved boot loaders by execution of a private key/public key exchange methodology.

8. The electronic device of claim 7, where the memory further maintains instructions that when executed by the processor, cause the processor to provide an indication that the boot loader is not authorized to be executed on the device when the generated hash value does not correspond to any member of the list of authorized hash values.

9. The electronic device of claim 7, wherein the received data indicating that the generated hash value should be added to the authorized list is received from an end user.

10. The electronic device of claim 7, wherein the received data indicating that the generated hash value should be added to the authorized list is received from an external entity.

11. A non-transitory computer readable medium storing code segments, that when executed by a processor, cause the processor to:
  retrieve a boot loader from a memory,
  determine whether the boot loader is authorized to be executed by consulting a list of approved boot loaders by:
    perform a hash function on visible components of the boot loader to generate a hash value, and compare the generated hash value with a list of approved hash values, where each approved hash value corresponds to an authorized boot loader,
  prevent boot loader code from executing if the boot loader is not authorized,
  wherein the boot loader loads a sequence of instructions that are stored in a different physical component than the memory; and
  receive data indicating that the generated hash value should be added to the list of approved boot loaders by execution of a private key/public key exchange methodology.

12. The non-transitory computer readable medium of claim 11, further including code segments, that when executed by a processor, cause the processor to not execute unauthorized boot loader code.

13. The non-transitory computer readable medium of claim 11, wherein the code segments that provide for determine whether the boot loader is authorized to be executed include code segments, that when executed by a processor, further cause the processor to perform a hash function on visible components of the detected boot loader code to generate a hash value, and comparing the generated hash value with a list of authorized hash values, where each hash authorized hash value corresponds to an authorized loader.

14. The non-transitory computer readable medium of claim 13, wherein the code segments when executed by the processor, cause the processor to provide an indication that the boot loader is not authorized to be executed on the underlying device when the generated hash value does not correspond to an entry in the list of authorized boot loaders.

* * * * *